(12) United States Patent
Lau et al.

(10) Patent No.: US 10,664,730 B2
(45) Date of Patent: May 26, 2020

(54) AUTHENTICATION DEVICES (71) Applicant: WAITAK LABELS FACTORY LIMITED, Kowloon, Hong Kong (CN)

(72) Inventors: Tak Wai Lau, Hong Kong (CN); Wing Hong Lam, Hong Kong (CN)

(73) Assignee: WAITAK LABELS FACTORY LIMITED, Kowloon, Hong Kong (CN)

( * ) Notice: Subject to any disclaimer, the term of this patent is extended or adjusted under 35 U.S.C. 154(b) by 197 days.

(21) Appl. No.: 15/501,676

(22) PCT Filed: Aug. 6, 2015

(86) PCT No.: PCT/IB2015/055962
§ 371 (c)(1),
(2) Date: Feb. 3, 2017

(87) PCT Pub. No.: WO2016/020867
PCT Pub. Date: Feb. 11, 2016

(65) Prior Publication Data
US 2017/0228628 A1  Aug. 10, 2017

(30) Foreign Application Priority Data
Aug. 6, 2014  (HK) .................................. 14108070

(51) Int. Cl.
*G06K 19/02*  (2006.01)
*G06K 19/06*  (2006.01)
(Continued)

(52) U.S. Cl.
CPC ........... *G06K 19/027* (2013.01); *D02G 3/346* (2013.01); *D03D 13/004* (2013.01);
(Continued)

(58) Field of Classification Search
CPC ........... G06K 19/027; G06K 19/06009; G06K 19/00; G06K 9/6215; G06K 19/06046;
(Continued)

(56) References Cited

U.S. PATENT DOCUMENTS 3,744,232 A * 7/1973 Shah ...................... D02G 3/34
57/204
4,530,113 A * 7/1985 Matterson ................ A61F 2/06
139/387 R
(Continued)

FOREIGN PATENT DOCUMENTS

| CN | 101799869 A | 8/2010 |
|---|---|---|
| EP | 2148288 A1 | 1/2010 |

(Continued)

OTHER PUBLICATIONS

European Extended Search Report (Application No. EP15829485.0) dated Feb. 9, 2018.
(Continued)

*Primary Examiner* — Xuemei G Chen
(74) *Attorney, Agent, or Firm* — Nixon Peabody LLP; Jeffrey L. Costellia (57) ABSTRACT

An authentication device comprising a woven authentication pattern, wherein the woven authentication pattern comprises a plurality of pattern forming woven elements each defining at least one pattern defining element or a plurality of pattern defining elements, and each pattern forming woven element is formed by a plurality of threads having contrasting optical or visual properties in twisted mutual engagement, wherein said pattern defining element has a spiralling outline or boundary and adjacent or abutting pattern defining elements of a pattern forming woven element are visually or optically distinguishable.

14 Claims, 8 Drawing Sheets

(51) Int. Cl.
G06K 19/00 (2006.01)
G09F 3/02 (2006.01)
D06H 1/00 (2006.01)
D03D 13/00 (2006.01)
D03D 15/00 (2006.01)
D02G 3/34 (2006.01)
D06H 1/04 (2006.01)
G06K 9/62 (2006.01)
D06F 93/00 (2006.01)

(52) U.S. Cl.
CPC ..... *D03D 15/0027* (2013.01); *D03D 15/0033* (2013.01); *D06H 1/00* (2013.01); *D06H 1/043* (2013.01); *G06K 9/6215* (2013.01); *G06K 19/00* (2013.01); *G06K 19/06009* (2013.01); *G06K 19/06046* (2013.01); *G09F 3/02* (2013.01); *D06F 93/005* (2013.01)

(58) Field of Classification Search
CPC .......... D06H 1/043; D06H 1/00; D02G 3/346; D03D 15/0027; D03D 15/0033; D03D 13/004; G09F 3/02; D06F 93/005
USPC ...... 57/23, 238; 139/387 R, 110; 174/124 R; 235/376; 280/743.1; 382/100; 442/182; 606/228; 623/1.13, 1.53
See application file for complete search history.

(56) References Cited

U.S. PATENT DOCUMENTS

| | | | | |
|---|---|---|---|---|
| 4,819,914 A * | 4/1989 | Moore | ............ | A01K 3/005 |
| | | | | 174/124 R |
| 4,834,755 A * | 5/1989 | Silvestrini | ............ | A61F 2/06 |
| | | | | 623/1.53 |
| 4,959,069 A * | 9/1990 | Brennan | ...... | A61B 17/06166 |
| | | | | 606/228 |
| 5,236,447 A * | 8/1993 | Kubo | ............ | A61F 2/06 |
| | | | | 623/1.13 |
| 6,068,895 A | 5/2000 | Kimura | | |
| 6,249,588 B1 | 6/2001 | Amidror et al. | | |
| 9,082,062 B2 * | 7/2015 | Sharma | ............ | G06K 19/06037 |
| 9,402,753 B2 * | 8/2016 | Du | ............ | A61F 2/06 |
| 9,404,218 B2 * | 8/2016 | Xu | ............ | B32B 5/06 |
| 9,633,195 B2 * | 4/2017 | Lau | ............ | H04W 12/06 |
| 9,658,373 B2 * | 5/2017 | Downing | ............ | G06K 7/12 |
| 9,957,648 B2 * | 5/2018 | Lau | ............ | D03D 1/0011 |
| 10,140,563 B2 * | 11/2018 | Lau | ............ | G06K 19/06037 |
| 2002/0160678 A1 * | 10/2002 | Hayakawa | ............ | H04R 7/02 |
| | | | | 442/197 |
| 2003/0080549 A1 | 5/2003 | Tischer | | |
| 2004/0128973 A1 * | 7/2004 | Morikawa | ............ | D02G 3/28 |
| | | | | 57/238 |
| 2005/0009430 A1 * | 1/2005 | Tsung-Yueh | ............ | D02G 3/28 |
| | | | | 442/189 |
| 2005/0103396 A1 * | 5/2005 | Schwartz | ............ | A47C 5/02 |
| | | | | 139/110 |
| 2006/0251287 A1 * | 11/2006 | Tsurumaki | ............ | G07D 7/0034 |
| | | | | 382/100 |
| 2007/0004303 A1 * | 1/2007 | Tanaka | ............ | D02G 3/32 |
| | | | | 442/182 |
| 2007/0007756 A1 * | 1/2007 | Okuno | ............ | B60R 21/235 |
| | | | | 280/743.1 |
| 2007/0098965 A1 * | 5/2007 | Hoshiyama | ............ | B42D 25/00 |
| | | | | 428/195.1 |
| 2007/0125060 A1 * | 6/2007 | Theis | ............ | D07B 1/145 |
| | | | | 57/210 |
| 2008/0009960 A1 | 1/2008 | Jinlian et al. | | |
| 2008/0238176 A1 * | 10/2008 | Wang | ............ | A47C 5/02 |
| | | | | 297/451.9 |
| 2009/0208695 A1 * | 8/2009 | Funatsu | ............ | D01D 5/253 |
| | | | | 428/97 |
| 2010/0307789 A1 * | 12/2010 | Sakai | ............ | H01B 7/04 |
| | | | | 174/112 |
| 2011/0047957 A1 * | 3/2011 | Richard | ............ | D02G 3/441 |
| | | | | 57/236 |
| 2012/0304462 A1 * | 12/2012 | Wei | ............ | H01F 41/07 |
| | | | | 29/874 |
| 2013/0277425 A1 * | 10/2013 | Sharma | ............ | B65D 90/00 |
| | | | | 235/376 |
| 2015/0128553 A1 * | 5/2015 | Devero | ............ | D07B 7/167 |
| | | | | 57/23 |
| 2016/0358690 A1 * | 12/2016 | Liu | ............ | B32B 5/028 |
| 2017/0037546 A1 * | 2/2017 | Lau | ............ | D03D 1/0011 |
| 2018/0249070 A1 * | 8/2018 | Lau | ............ | H04N 5/23222 |

FOREIGN PATENT DOCUMENTS

WO WO 2013179249 A1 12/2013
WO WO 2013179250 A1 12/2013

OTHER PUBLICATIONS

International Search Report for PCT/IB2015/055962 dated Nov. 27, 2015.

* cited by examiner

| 1 | 1 | 0 | 1 | 1 | 0 | 0 | 1 | 1 | 1 | 0 | 0 |
|---|---|---|---|---|---|---|---|---|---|---|---|
| 1 | 0 | 1 | 1 | 0 | 1 | 1 | 1 | 1 | 0 | 1 | 1 |
| 1 | 0 | 1 | 1 | 0 | 0 | 1 | 0 | 0 | 0 | 1 | 0 |
| 0 | 1 | 1 | 0 | 1 | 1 | 0 | 0 | 1 | 0 | 0 | 0 |
| 1 | 1 | 1 | 1 | 0 | 1 | 0 | 0 | 1 | 0 | 1 | 1 |

AUTHENTICATION DEVICES

The present disclosure relates to authentication, and more particularly to authentication devices, authentication apparatus and methods of authentication.

Authentication devices are widely used in security or authentication applications and authentication devices having enhanced security features are desirable.

An authentication device comprising a woven authentication pattern is disclosed. The woven authentication pattern comprises a plurality of pattern forming woven elements each defining at least one pattern defining element or a plurality of pattern defining elements. Each pattern forming woven element is formed by a plurality of threads having contrasting optical or visual properties in twisted mutual engagement. Said pattern defining element has a spiralling outline or boundary and adjacent or abutting pattern defining elements of a pattern forming woven element are visually or optically distinguishable.

A method of verifying authenticity of an authentication device is disclosed. The method comprises using a processor-based or computer-based device to:
 capture an image of the authentication device,
 locate and retrieve a reference pattern or patterns from a storage device,
 compare similarity or identify differences between the woven authentication pattern with the reference pattern or patterns, and
 verify authenticity according to outcome of comparison of similarity or differences.

An authentication apparatus comprising an image capture device, a processor, a memory device and instructions stored in the memory device is disclosed. The apparatus is operable upon execution of the stored instructions to:
 capture an image of the authentication device,
 locate and retrieve a reference pattern or patterns using identification information contained in the identification pattern,
 compare similarity or identify differences between the woven authentication pattern with the reference pattern or patterns, and
 verify authenticity and display result according to outcome of comparison of similarity or differences.

In some embodiments, at least some pattern forming woven element comprise adjacent or abutting pattern defining elements having contrasting optical or visual properties.

In some embodiments, the woven authentication pattern comprises a plurality of threads in twisted engagement to form a row of pattern forming woven elements and adjacent pattern forming woven elements on the row are separated by a woven partitioning element.

In some embodiments, the woven authentication pattern comprises at least one row of pattern forming woven elements and the row comprises a plurality of pattern forming woven elements, and wherein each pattern forming woven element has a spiralling outline or boundary, and the spiralling outlines or boundaries of adjacent and/or abutting pattern forming woven elements of the row are in continuity.

In some embodiments, the woven authentication pattern is formed into a plurality of adjacent or abutting rows of pattern forming woven elements and a plurality of adjacent or abutting columns of pattern forming woven elements.

In some embodiments, at least some of the pattern forming woven element comprise a plurality of spiralling or helical pattern defining elements, said spiralling or helical pattern defining elements being in twisted mutual engagement and having contrasting colours.

In some embodiments, each pattern forming woven element has a characteristic pattern which is formed by twisted mutual engagement of the plurality of threads, said threads having contrasting colours and each said characteristic pattern is unique among said plurality of pattern forming woven elements.

In some embodiments, the woven authentication pattern comprises a plurality of N pattern forming woven elements, and the N pattern forming woven elements contain M pattern defining elements, both M and N are integers and M≥N; and wherein adjacent or abutting pattern defining elements of a pattern forming woven element are visually differentiable or distinguishable from each other.

In some embodiments, M is equal to or larger than 2N, equal to or larger than 3N, and/or equal to or larger than 4N.

In some embodiments, at least one or all of the plurality of threads has a denier value of 100 or below.

In some embodiments, the authentication device comprises an alignment device, the alignment device comprising alignment elements which are distributed around, adjacent or abutting the woven authentication pattern.

In some embodiments, the authentication device further comprises an identification pattern which contains identification data, wherein the identification data are human readable and/or are process-able by a processor-based or computer-based device to retrieve a reference pattern or patterns for verifying authenticity with respect to the authentication pattern.

In some embodiments, the woven authentication pattern occupies an area which is smaller than area occupied by the identification pattern, or less than 1 $cm^2$.

In some embodiments, the alignment device is disposed proximal to or in abutment with the woven authentication pattern and/or the identification pattern.

In some embodiments, the identification data is formed by a plurality of woven identification elements and area density of the woven identification elements is substantially lower than area density of the pattern forming woven elements and/or the pattern defining elements.

In some embodiments, the identification data contains information on location of a pattern storage device from which the reference pattern or patterns for verifying authenticity is retrievable.

In some embodiments, the authentication pattern and the identification pattern are woven as an integral and flexible woven piece.

In some embodiments, the method comprises storing a plurality of reference patterns on a remote storage, and performing comparison of similarity or identification of differences between the woven authentication pattern with the reference pattern or patterns at locality of image capture or at a remote site.

In some embodiments, the method comprises establishing a database comprising a plurality of reference patterns, wherein each reference pattern or a set of reference patterns is associated with a specific identification data such that the plurality of reference patterns is associated with a corresponding plurality of identification data.

In some embodiments, the method comprises a template matching process to evaluate authenticity of the authentication pattern by comparing similarity or identifying differences between the authentication pattern and the reference pattern or patterns retrieved.

In some embodiments, the method comprises using identification information contained in the identification pattern to locate and retrieve the reference pattern or patterns.

In some embodiments, the authentication apparatus comprises a wireless telecommunication frontend and the apparatus is operable to retrieve the reference pattern or patterns from a remote source via the wireless telecommunication frontend for display and/or comparison.

FIGURES

The present disclosure will be described by way of examples with reference to the accompanying Figures, in which:

FIGS. 1A1, 1A2 and 1A3 show example thread members of the example string of FIG. 1A.

DESCRIPTION

Figure 1:
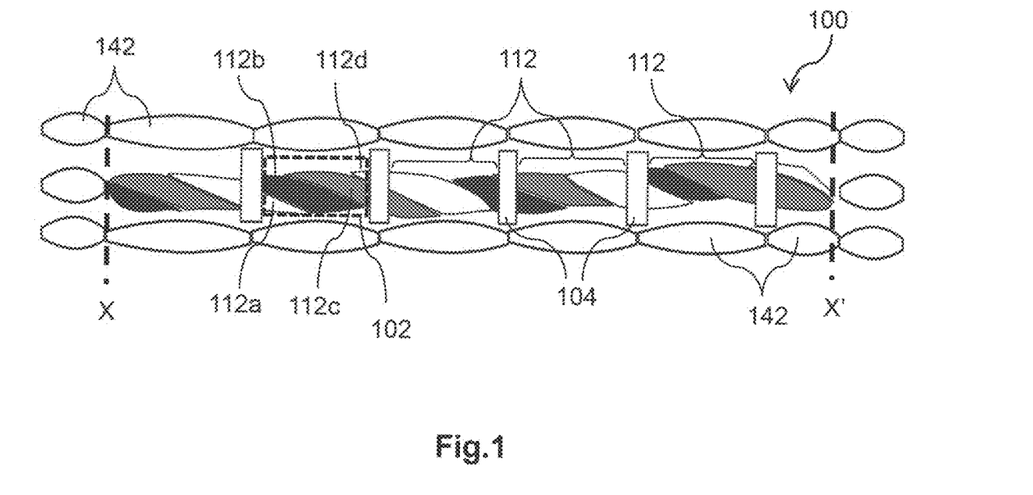
FIG. 1 shows an example authentication device.

An example authentication device 100 shown in FIG. 1 comprises a plurality of pattern forming members 112 to form an authentication pattern. The pattern forming members 112 are distributed consecutively or serially in a longitudinal direction to form a row of pattern forming members.

Each pattern forming member 112 comprises at least one pattern defining element. An example pattern forming member 112 contained inside an imaginary dotted box 102 comprises a plurality of pattern defining elements, namely, 112a, 112b, 112c and 112d.

Figure 1A:
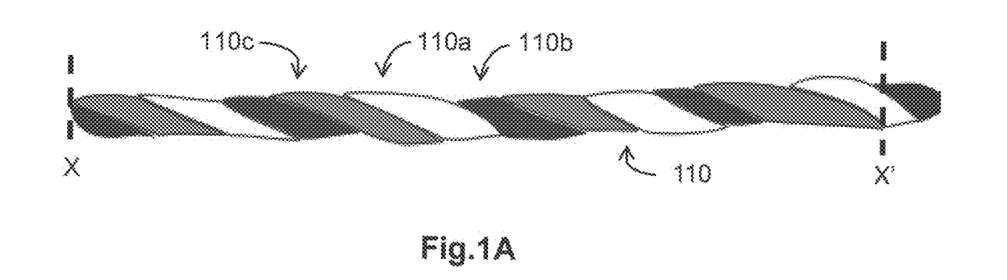
FIG. 1A shows an example string of the authentication device of FIG. 1.

Each pattern forming member 112 comprises a length portion of an example string 110. The string 110 extends in a longitudinal direction to define its length. The string 110 comprises a plurality of member threads 110a, 110b, 110c, in twisted engagement. The member threads 110a, 110b, 110c, have different visual or optical properties and are twisted along their lengths to form a twisted ensemble of member threads, as depicted in FIG. 1A. The string 110 has a generally wavy or rippled boundary outline due to its formation by twisted engagement of the member threads.

The string 110 is partitioned along its length into a plurality of string segments and each string segment defines one pattern forming member 112. Adjacent string segments are delineated or separated by a partitioning member 104. The partitioning member 104 runs transversely to the longitudinal direction of the string 110 and cover a small portion of the string 110 to facilitate delineation or separation. A partitioning member 104 which is between two adjacent pattern forming members 112 is visually or optically distinguishable from or differentiable to each one of the immediately adjacent pattern forming member 112 to facilitate identification of the individual pattern forming members 112, for example, by naked eyes or by automated optical identification devices. Adjacent partitioning members 104 are spaced apart to define length of the string segment and length of the pattern forming member 112.

The example string 110 has six pattern forming member 112 defined by five partitioning members 104 distributed along the length of the string.

Figure 1A:
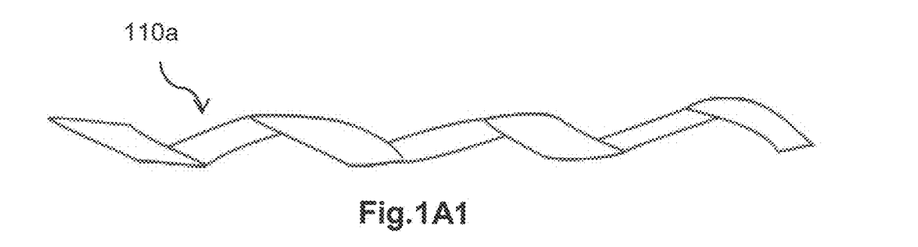
Figure 1A:
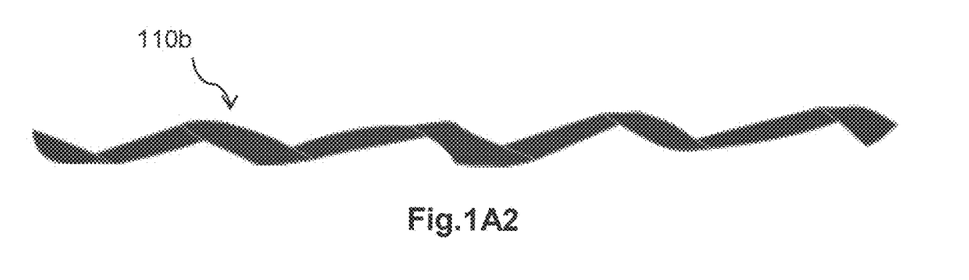
Figure 1A:
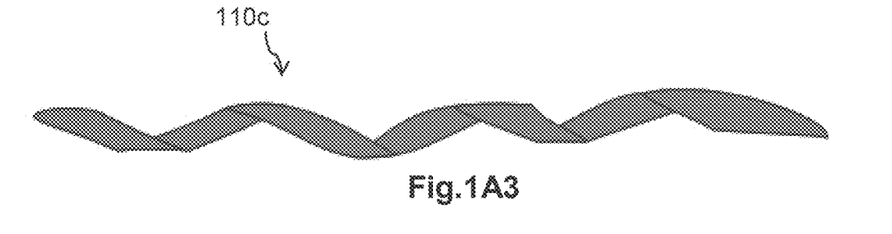

The member threads are made or intertwined into twisted mutual engagement to form the string, and each twisted member thread 110a, 110b, 110c, has a helical or spiralled shape and configuration, as depicted in FIGS. 1A1, 1A2, 1A3.

In general, there are two types of pattern defining elements in a pattern forming member, namely, a first type which is in abutment with two adjacent pattern defining elements and a second type which is in abutment with one adjacent pattern defining element and with one partitioning member. Each of the pattern defining elements, namely, 112a, 112b, 112c and 112d, has an internal abutment boundary which is in abutment with one adjacent pattern defining element or with two adjacent pattern defining elements. An internal abutment boundary which is in abutment with an adjacent pattern defining element has an internal abutment boundary outline. The internal abutment boundary outline spirals or runs in a helical manner with respect to the longitudinal direction of the string 110.

An internal abutment boundary which is in abutment with two adjacent pattern defining elements comprises a pair of spaced apart internal abutment boundary outlines. Each one of the spaced apart internal abutment boundary outlines spirals or runs in a helical manner with respect to the longitudinal direction of the string 110, and the two spaced apart internal abutment boundary outlines are parallel or substantially parallel. The two spaced apart internal abutment boundary outlines of a pattern defining element cooperate to define the extent or surface area of the pattern defining element on the pattern forming member 112 or the proportion of the surface area of the pattern defining element to the total surface area of the pattern forming members 112. Orthogonal separation distance between the two parallel or substantially parallel internal abutment boundary outlines of a pattern forming member 112 represents the width or diameter of the member thread.

An internal abutment boundary which is in abutment with only one adjacent pattern defining element has a single internal abutment boundary outline. The single internal abutment boundary outline spirals or runs helically. The one spaced apart internal abutment boundary outline cooperates with the partitioning member 104 to define the extent or surface area of the pattern defining element on the pattern forming member 112 or the proportion of the surface area of the pattern defining element to the total surface area of the pattern forming members 112.

Each of the pattern defining elements, namely, 112*a*, 112*b*, 112*c* and 112*d*, has an external boundary. The external boundary comprises two spaced apart external boundary outlines to define the transversal outline and transversal extent of a pattern forming member 112 and that of the string 110.

In this example, the pattern defining elements 112*a* and 112*d* are portions of the member thread 110*a*, the pattern defining element 112*b* is a portion of the member thread 110*b*, and the pattern defining element 112*c* is a portion of the member thread 110*c*.

In some embodiments, the member threads have different colors. For example, member thread 110*a* is in white, member thread 110*b* is in black, and member thread 110*c* is in grey.

The different colors may be contrasting or non-contrasting. In some embodiments, all or some of the member threads have contrasting colors. In some embodiments, at least two of the member threads have contrasting colors. For example, where an example string has three or four member threads, it would be useful if at least two of the member threads have contrasting colours to facilitate expeditious recognition. Adjacent pattern defining elements may have contrasting or non-contrasting colors. In some embodiments, adjacent pattern defining elements formed by twisting of non-contrasting colored thread members have a gradually changing appearance.

In some embodiments, the member threads may have optically or visually distinguishable patterns or textures, in addition to or as alternative to different colors.

In some embodiments, the string 110 is integrated into an article by weaving to form a woven authentication device.

In some embodiments, the string 110 is woven with other strings to form a woven article carrying a woven authentication device. In such embodiments, the other strings may form a woven background to carry or support the woven authentication device.

In some embodiments, the woven authentication device 100 is in abutment to a woven background.

In some embodiments, the strings in a woven authentication device and/or strings forming the woven background are non-shiny or de-lustered, so that glares in captured images are reduced.

Referring to FIG. 1, the string 110 and the partitioning members 104 are woven to form the example authentication device 100. The authentication device 100 is in abutment to a woven background comprising a plurality of woven members 140. The woven members 140 are distributed around the authentication device 100 to form a boundary and the authentication device 100 is contained within the boundary.

In some embodiments, the string 110 is part of the warp portion and the partitioning members 104 are part of the weft portion of the woven article.

In some embodiments, the string 110 is part of the weft portion and the partitioning members 104 are part of the warp portion of the woven article.

Figure 2:
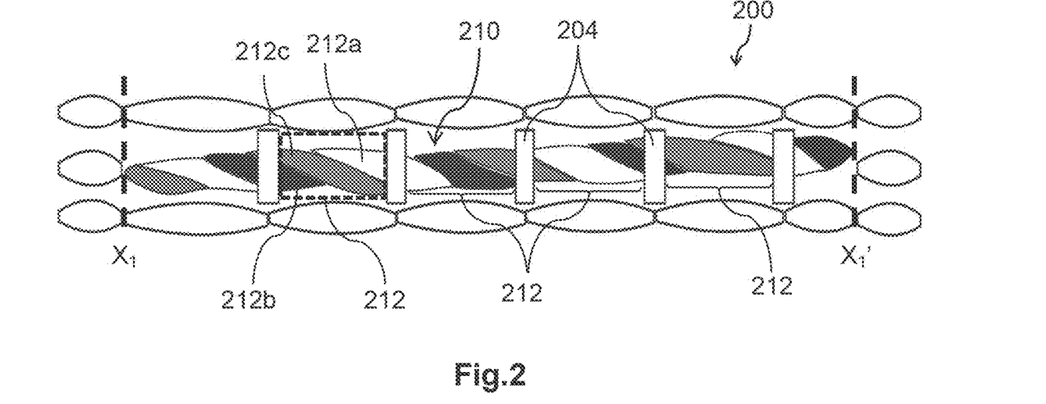
FIG. 2 shows an example authentication device.
Figure 2A:
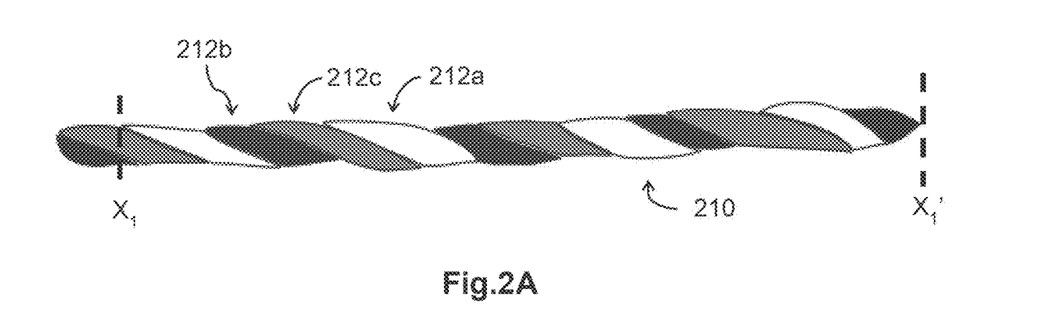
FIG. 2A shows an example string of the authentication device of FIG. 2.

An example authentication device 200 shown in FIG. 2 comprises a plurality of pattern forming members 212 to form an authentication pattern. The pattern forming members 212 are portions of a string 210 and are distributed consecutively or serially in a longitudinal direction of the string to form a row of pattern forming members. The formation, properties and characteristics of the authentication device 200 are identical or substantially identical to that of the authentication device 100 except for the description below. The description herein in relation to the authentication device 100, including the description relating to the woven article and the woven background is incorporated and applied, mutatis mutandis, herein, with the numerals increased by 100.

In the example authentication device 200 of FIG. 2, the string 210 is the same as string 110, but is shifted in the longitudinal direction relative to the partitioning members 204 when woven.

The substantial differences in appearance of the individual pattern forming members 212, compared to that of the corresponding individual pattern forming members 112; the substantial differences in appearance, shape and configuration of the constituting pattern defining elements, 212*a*, 212*b*, 212*c*, compared to that of the corresponding pattern defining elements, 112*a*, 112*b*, 112*c* and 112*d*; and the substantial differences in appearance of the overall pattern formed by the serial combination of the pattern forming members 212, compared to that of string 110, demonstrates the huge potential of the string 110, 210 in authentication applications, as a huge number of unique variation possibilities is available for selection and adoption.

In some embodiments, the string may have a smaller number or a larger number of member threads.

Figure 3:
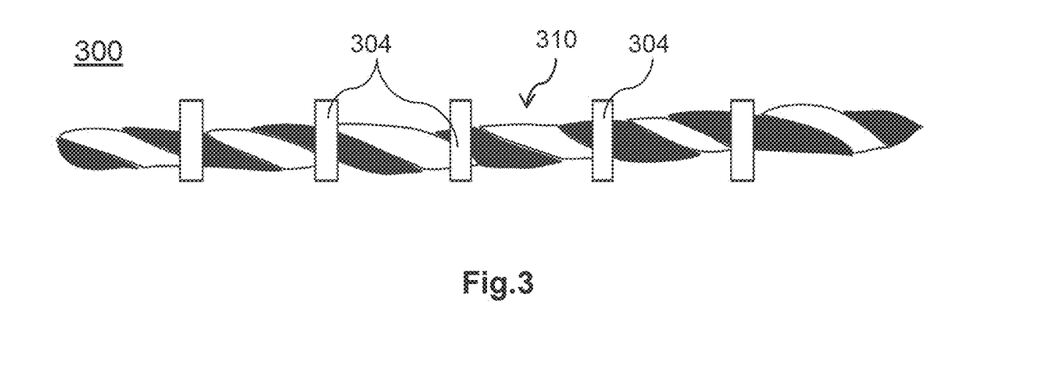
FIG. 3 shows an example authentication device.
Figure 3A:
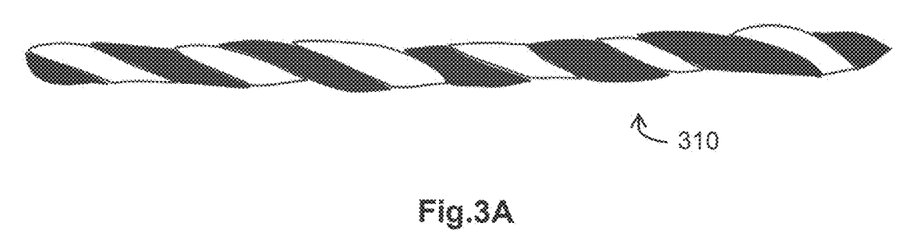
FIG. 3A shows an example string of the authentication device of FIG. 3.

For example, an example authentication device 300 depicted in FIG. 3 comprises a string 310 having two member threads of different visual or optical properties, as depicted in FIG. 3A. The two member threads are of contrasting colors, namely, black and white.

The variation in differences of appearances of the pattern forming members, variation in differences of appearance, shape and configuration of the constituting pattern defining elements; and variation in differences of appearances in the overall pattern may be further increased, for example, by changing twisted element density, by changing twisted element uniformity, and/or by changing separation distance between adjacent partitioning members.

Figure 4:
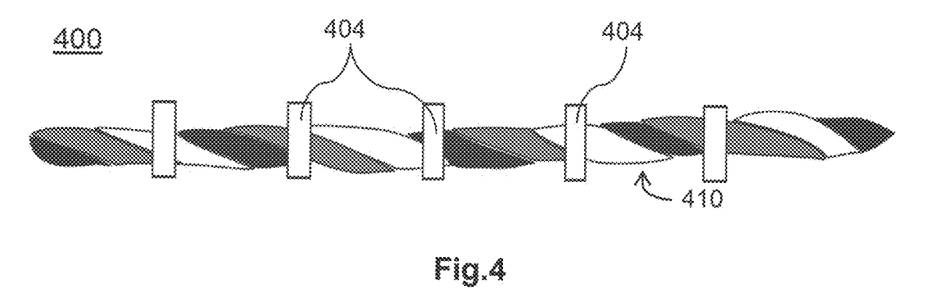
FIG. 4 shows an example authentication device.
Figure 4A:
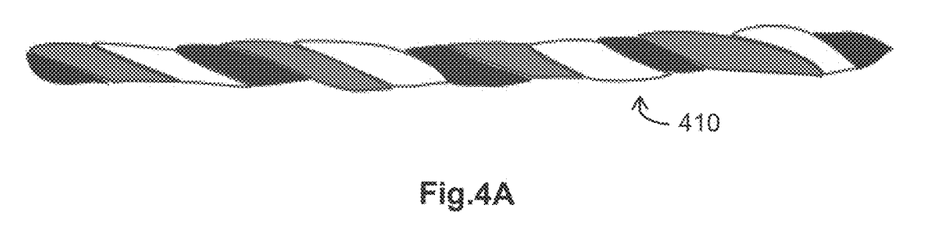
FIG. 4A shows an example string of the authentication device of FIG. 4.

An example authentication device 400 depicted in FIG. 4 has a string 410 and a plurality of partitioning members 404. The string 410 has the same structure and formation as that of string 110, as depicted in FIG. 4A, and the description herein in relation to the authentication device 100, including the description relating to the woven article and the woven background is incorporated and applied, mutatis mutandis, herein, with the numerals increased by 300.

Figure 5:
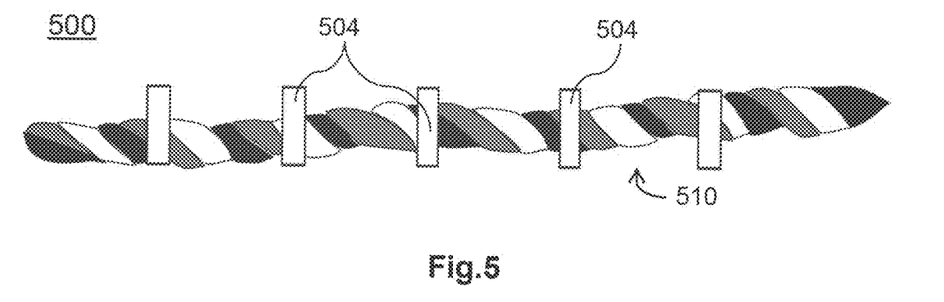
FIG. 5 shows an example authentication device.
Figure 5A:
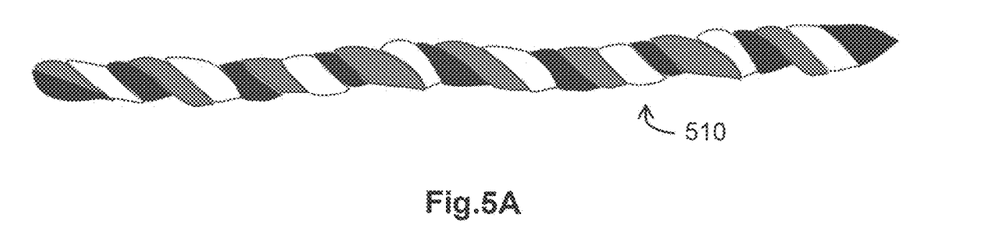
FIG. 5A shows an example string of the authentication device of FIG. 5.

An example authentication device 500 depicted in FIG. 5 has a string 510 and a plurality of partitioning members 504. The string 510 has the same structure and formation as that of string 110, as depicted in FIG. 5A, and the description herein in relation to the authentication device 100, including the description relating to the woven article and the woven background is incorporated and applied, mutatis mutandis, herein, with the numerals increased by 400.

In the example herein, a string has a twisted element density of between 11 to 25 twisted elements per unit length. A practically convenient example range is between 11 to 13 twisted elements per 8.3 mm.

The example string 410 has an example twisted element density of 13 twisted elements per unit length of string.

The example string 510 has an example twisted element density of 25 twisted elements per unit length of string.

In some embodiments, the member threads are fine threads having a denier value of 100 or below.

As can be visualized from a comparison between FIGS. 4 and 5, the variation in twisted element density can bring about substantially and remarkably unique differences to facilitate and enhance authentication applications.

Figure 6:
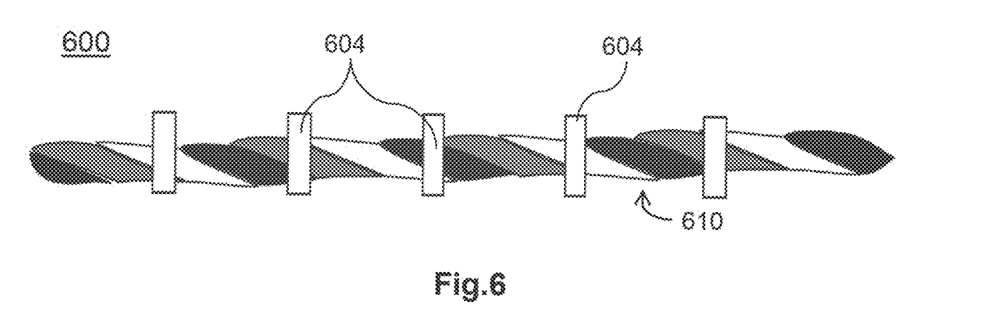
FIG. 6 shows an example authentication device.
Figure 6A:
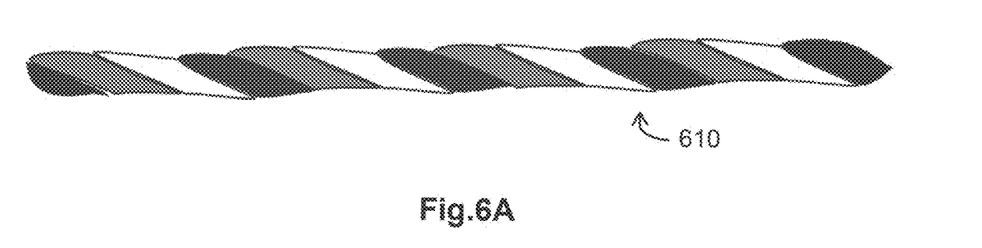
FIG. 6A shows an example string of the authentication device of FIG. 6.

An example authentication device 600 depicted in FIG. 6 has a string 610 and a plurality of partitioning members 604. The string 610 has the same structure and formation as that of string 110, as depicted in FIG. 6A, and the description herein in relation to the authentication device 100, including the description relating to the woven article and the woven background is incorporated and applied, mutatis mutandis, herein, with the numerals increased by 500.

Figure 7:
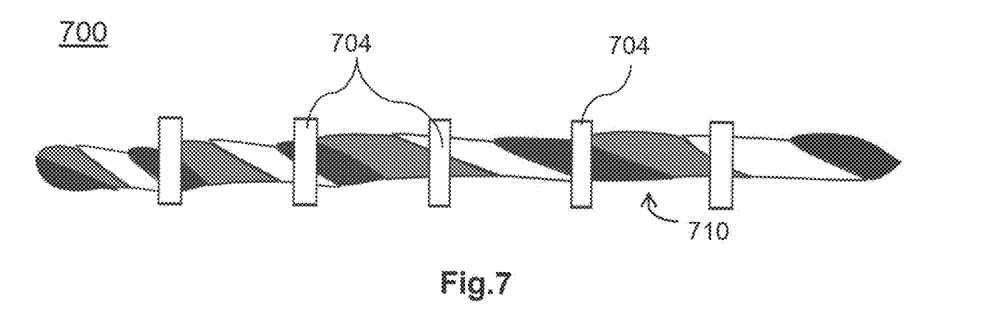
FIG. 7 shows an example authentication device.
Figure 7A:
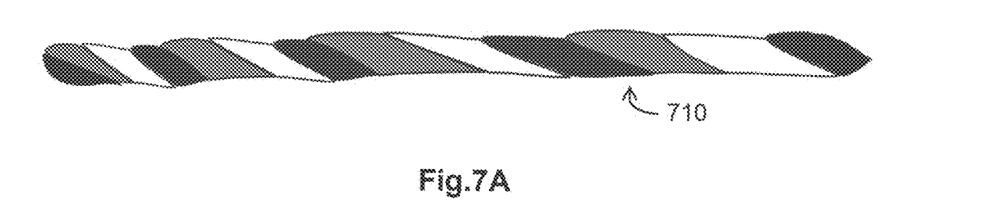
FIG. 7A shows an example string of the authentication device of FIG. 7.

An example authentication device 700 depicted in FIG. 7 has a string 710 and a plurality of partitioning members 704. The string 710 has the same structure and formation as that of string 110, as depicted in FIG. 7A, and the description herein in relation to the authentication device 100, including the description relating to the woven article and the woven background is incorporated and applied, mutatis mutandis, herein, with the numerals increased by 600.

The string 610 has a uniform twisted element density along its length while the string 710 has a non-uniform or variable twisted element density along its length, having a higher density on one side and a lower twisted element density on another side.

As can be visualized from a comparison between FIGS. 6 and 7, the variation in twisted element uniformity can bring about substantially and remarkably unique differences to facilitate and enhance authentication applications.

In some embodiments, the plurality of pattern forming members is arranged into a plurality of rows of pattern forming members. The rows of pattern forming members may be spaced apart, may be in adjacency or may be in abutment.

Figure 8:
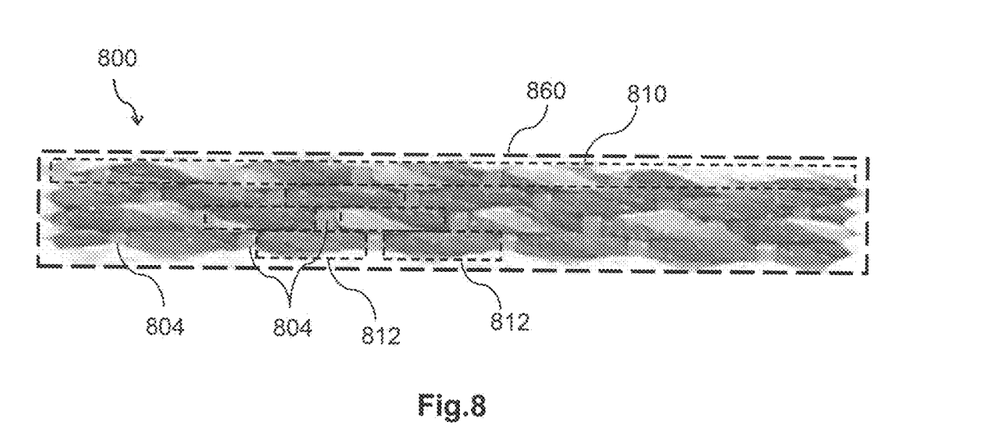
FIG. 8 shows an example authentication device.

An example authentication device 800 shown in FIG. 8 comprises a plurality of pattern forming members 812 arranged to form an authentication pattern 860. The pattern forming members 812 are distributed into a plurality of abutting rows of pattern forming members 812.

Each row of pattern forming members 812 comprises a string 810 and a plurality of partitioning members 804. The string 810 has the same structure and formation as that of string 110 except that the string 810 is formed by mutually twisted engagement of thread members of different example colors, namely, red, light yellow, blue. Strings on alternate rows have colors red, green and blue. The description herein in relation to the authentication device 100, including the description relating to the woven article and the woven background is incorporated and applied, mutatis mutandis, herein, with the numerals increased by 700.

The partitioning members 804 on immediately adjacent rows are not aligned and are in off-set relationship. In some embodiments, the partitioning members 804 on alternate adjacent rows are aligned. In some embodiments, partitioning members 804 on alternate adjacent rows are not aligned.

In some embodiments, partitioning members 804 on some alternate adjacent rows are aligned and some not aligned. In some embodiments, the partitioning members 804 on immediately adjacent rows can be aligned without loss of generality.

Figure 9:
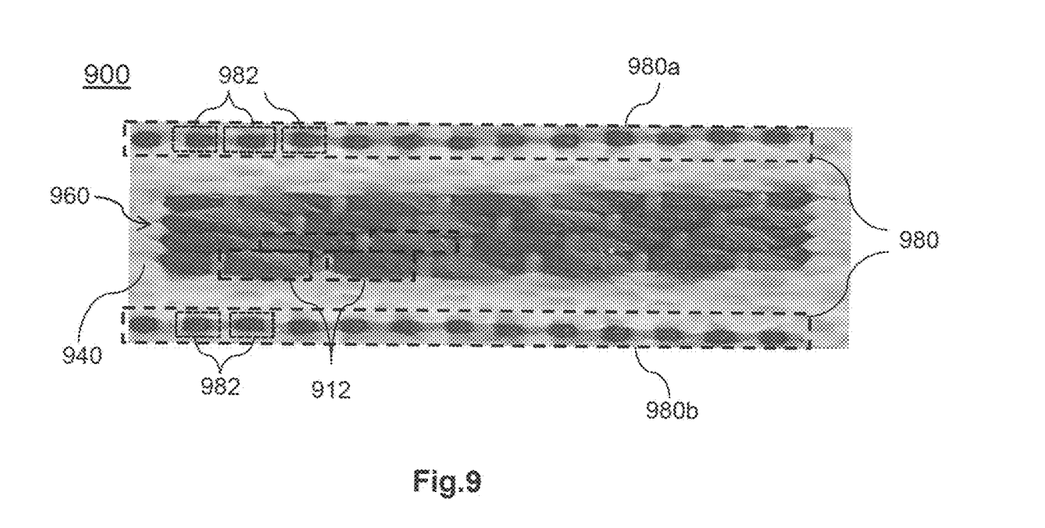
FIG. 9 shows an example authentication device.

An example authentication device 900 shown in FIG. 9 comprises a plurality of pattern forming members 912 arranged to form an authentication pattern 960 and an alignment device 980 comprising a first portion 980a and a second portion 980b, which disposed adjacent to the authentication pattern 960. The authentication pattern 960, including its structure, formation and properties, is identical or substantially identical to that of the authentication pattern 860, except that the authentication pattern is formed from two types of strings, namely a first string comprising thread members in colours dark red, dark green and blue, and a second string comprising thread members in colours dark red, blue and yellow. The first and second strings are woven to form alternate rows in this example. In some embodiments, first and second types of strings may be woven, whether in alternate or non-alternate rows, to form an authentication pattern. The description herein in relation to the authentication device 800, including the description relating to the woven article and the woven background is incorporated and applied, mutatis mutandis, herein, with the numerals increased by 100.

The authentication pattern 960 is integrated to form part of a woven article. The woven article is in an example form of a woven label or a woven tag and forms a woven background comprising a plurality of woven members 940 in proximity to the authentication pattern 960. The alignment device 980 (indicated by a dotted box) is woven on the woven background. The alignment device 980 is to facilitate alignment of the authentication pattern 960 and comprises a plurality of alignment members 982. The alignment members 982 are arranged in a row and is adjacent the authentication pattern 960.

The authentication pattern 960 comprises a total of 26 pattern forming members 912 arranged into four abutting rows, and has dimensions 8.3 mm×1.1 mm.

In general, an authentication pattern may comprises N pattern forming members and each pattern forming member may comprise 1-K pattern defining elements, N and K are integers with N≥1 and K>1. In the case of N=1, no partitioning member is necessary. While K can be any integer number, a convenient range would be 2-4 or 2-6. The total number of pattern defining elements M of the authentication pattern would be substantially higher than N, i.e., M≥N. For example, M may be equal to or larger than 2N, equal to or larger than 3N, and/or equal to or larger than 4N. The pattern forming members may be arranged into one or a plurality of rows without loss of generality.

Figure 10:
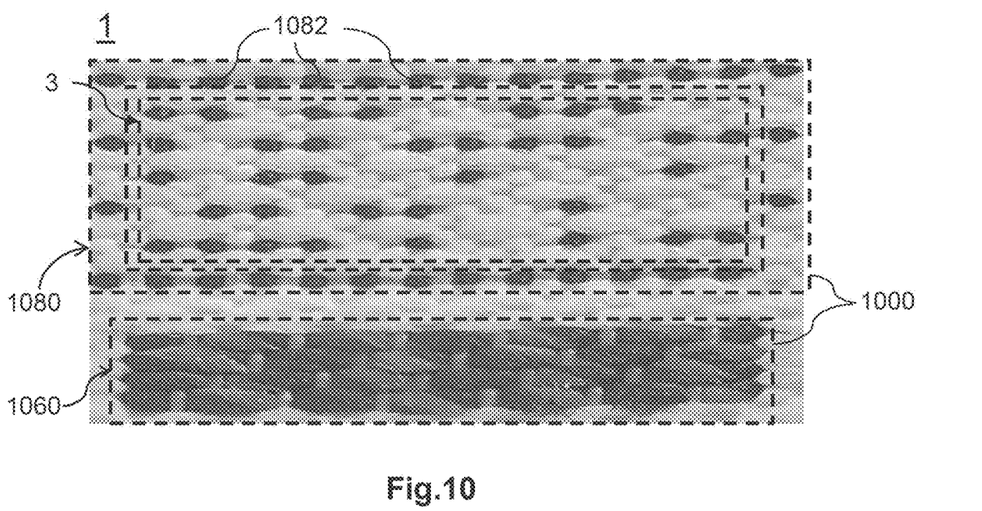
FIG. 10 shows an example article carrying an example authentication device and an information bearing device.

An example article 1 depicted in FIG. 10 comprises an authentication device 1000 and an information bearing device 3 such as an identification device. The authentication device 1000 comprises an authentication pattern 1060 and an alignment device 1080. The authentication pattern 1060 is identical to the authentication pattern 960. The alignment device 1080 comprises alignment members 1082 which are arranged along the sides of a rectangle to surround the information bearing device 3. The information bearing device 3 is disposed adjacent to the authentication device 1000 to provide guidance or other reference data or information where necessary or appropriate. The information or data carried by the information bearing device can be manually or machine readable.

Figure 10A:
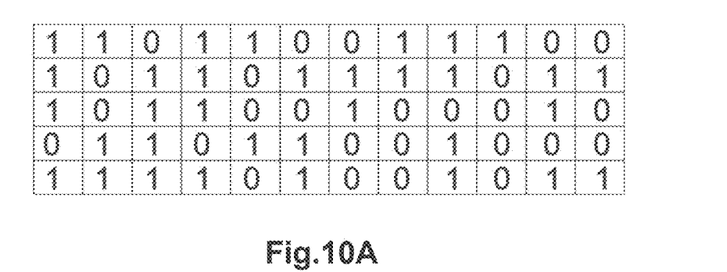
FIG. 10A is a table showing data carried by an information bearing device of FIG. 10.

In some examples, the data or information carried by the information bearing device 3 may be as depicted in FIG. 10A, where a black element represents "1" and a white element represents "0". Of course, other data coding schemes can apply without loss of generality.

Figure 10B:
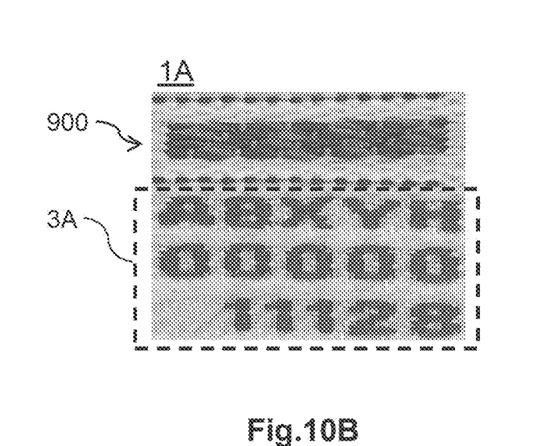
FIG. 10B shows an example article carrying an example authentication device of FIG. 9 and an information bearing device.

An example article 1A depicted in FIG. 10B comprises an authentication device 900 and an information bearing device 3A such as an identification device. The data or information carried by information bearing device 3A is human readable.

Figure 10C:
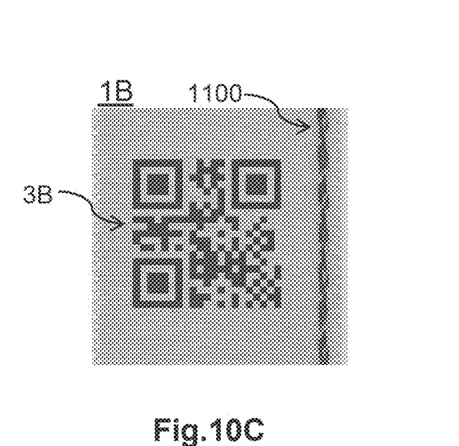
FIG. 10C shows an example article carrying an example authentication device and an information bearing device.

An example article 1B depicted in FIG. 100 comprises an authentication device 1100 and an information bearing device 3B such as an identification device. The data or information carried by information bearing device 3B and the machine readable code represents data AB00001 as a convenient example.

The information bearing device may be woven, printed or formed by any marking process. Where the information bearing device is woven, the information bearing device and authentication device may be integrally woven as a single piece.

Example applications of the authentication devices of the present disclosure will be described.

During authentication operations, an image comprising a target article is captured. The image of the target article is compared with a reference or verification pattern to determine similarity or difference. If the outcome of comparison is positive, which means the captured target image is identical, substantially similar or not substantially different to the reference or verification pattern, authenticity is confirmed.

The comparison process may be manual or automated by operation of processors of a computer executing stored instructions.

Figure 11A:
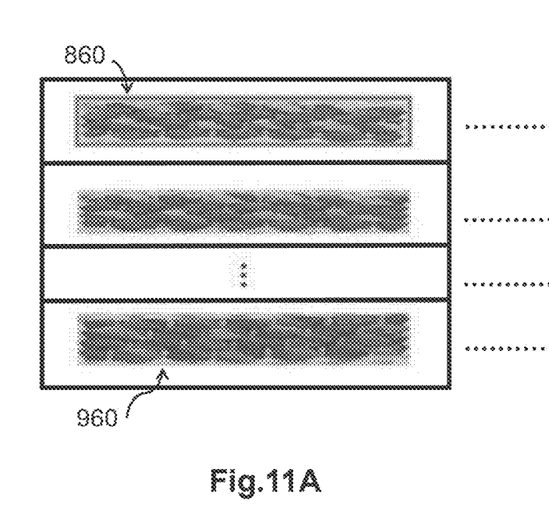
FIG. 11A is a schematic diagram depicting a database of reference or verification patterns.

In example operations, a plurality of reference or verification patterns is stored for subsequent retrieval or use, as depicted in FIG. 11A. The processor of a computer may upon execution of stored instructions search through the databases and retrieve a comparable verification pattern to perform comparison. The comparison may be by manual or automated operation.

Where automated comparison is performed, the processor may execute stored instructions of comparison algorithms to perform pattern comparison, for example, by performing template matching or color content matching.

In example automated operations, colour separation operations are performed to facilitate pattern comparison. The colour contents of each pattern forming members 912 of a portion of a captured target image (or target pattern) and a reference pattern will be determined by the processor with respect to the basic colours components: red, green and blue. A comparison algorithm of the form below will then be performed to determine a difference coefficient, S, where M is the number of pixels of the reference pattern which is also the number of pixels of the target pattern, $R_i^{(1)}$ means the red grayscale (or red-scale) value of the i-th pixel of the target pattern (TP or (1)) and $R_i^{(2)}$ means the red-scale value of the corresponding i-th pixel of the reference pattern (RP or (2)). Likewise, $G_i^{(1)}$ and $G_i^{(2)}$ mean the same for the green grayscale (or green-scale) value and $B_i^{(1)}$ and $B_i^{(2)}$ mean the same for the blue grayscale (or blue-scale) value.

In example automated operations, the entire or a portion of a captured image of a target authentication pattern (or target pattern in short) may be used to compare with a reference or verification pattern.

$$S = \Sigma_{i=1}^{M}((R_i^{(1)} - R_i^{(2)})^2 + (G_i^{(1)} - G_i^{(2)})^2 + (B_i^{(1)} - B_i^{(2)})^2)$$

If the difference coefficient S is below a difference threshold, a positive outcome to confirm authenticity will return.

In some embodiments, a set of reference patterns is retrieved for authentication, the captured target image of a woven authentication device is compared with the set of reference patterns to obtain a set of difference coefficients $S_k$ for a set of k reference patterns associated with a common identification data and the smallest difference coefficient for the set is compared to a predetermined difference threshold. If the smallest difference coefficient is below the difference threshold, a positive outcome to confirm authenticity will return.

Figure 11B:
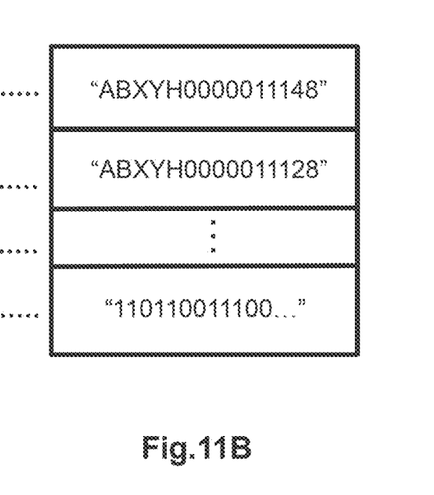
FIG. 11B is a schematic diagram depicting an example database of specific and associated identification data associated with the database of reference or verification patterns of FIG. 11A.

In some example embodiments, each reference or verification pattern stored in the databases of FIG. 11A has a specific and associated identification data, as depicted in FIG. 11B. As an example, the information bearing device 3 may carry guidance information to facilitate retrieval of a reference or verification pattern using the specific and associated identification data.

Figure 11C:
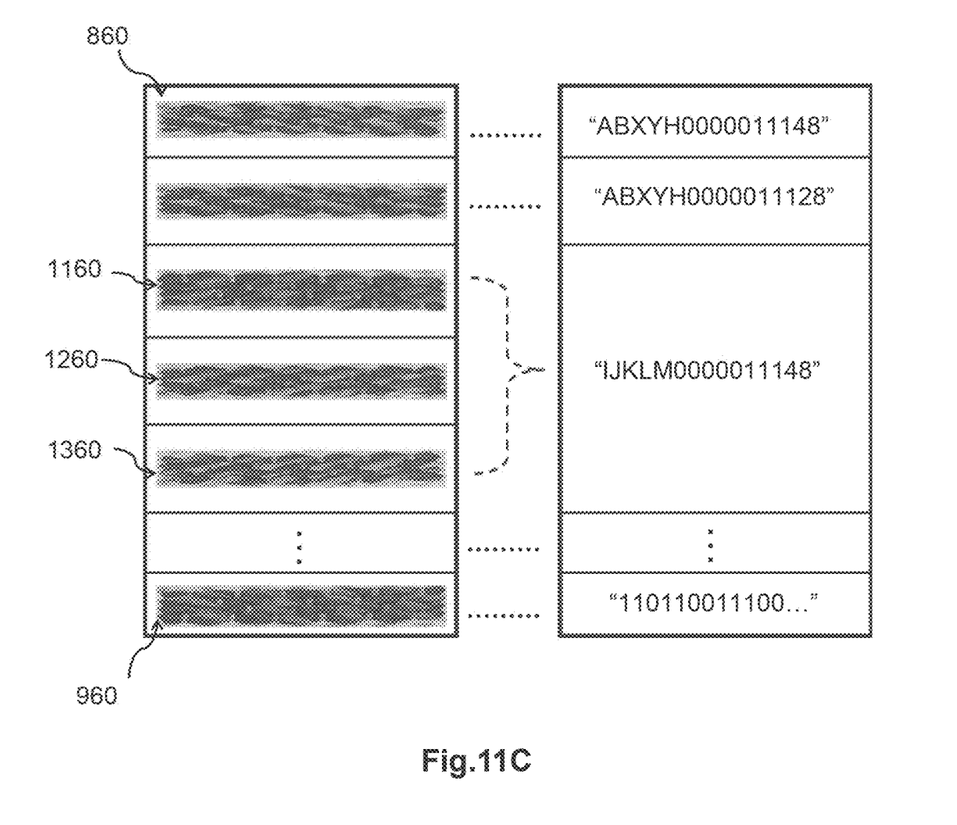
FIG. 11C is a schematic diagram depicting another example database of associated identification data and associated reference or verification patterns.

In some embodiments, a plurality of reference or verification patterns may have a common associated identification data, as depicted in FIG. 110. The common associated identification data may, for example, be a batch number or a common serial number relating to a plurality of authentication patterns 1160, 1260, 1360, having different visual properties and/or characteristics.

In example authentication operations, an image of a target article comprising a target pattern is captured. The captured target article is then analysed to extract the target authentication pattern and guidance information contained in the information bearing device. By utilising the guidance information, a reference verification pattern or patterns can be expediently retrieved to proceed to verification comparison by executing comparison algorithms such as those described herein.

Figure 12:
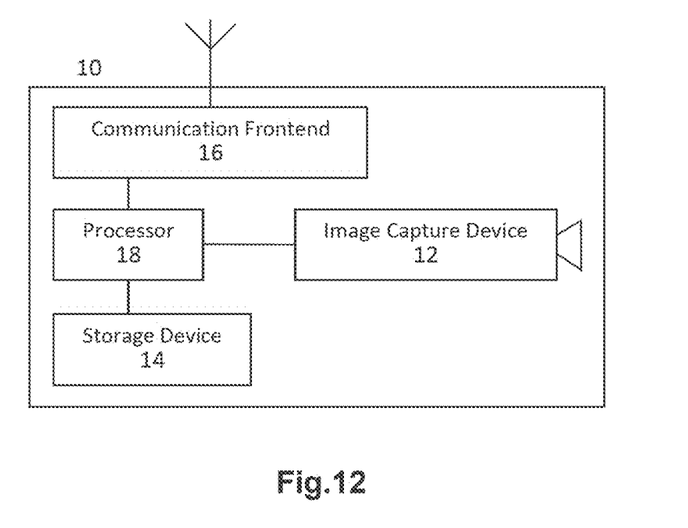
FIG. 12 is a schematic block diagram of an example authentication apparatus.

An example authentication apparatus 10 for performing verification comparisons is depicted in FIG. 12. The apparatus 10 comprises an image capture device 12, a storage device 14 including volatile memory such as RAM and non-volatile memory such as ROM, EEPROM or flash memory, a communication frontend 16 which is adapted to communicate with a data network, and a processor 18 such as a microprocessor configured to execute stored instructions. The stored instructions may be in the form of an application software or "App" in short. The database of verification patterns and the specific and associated identification data, if available, may be stored in the storage device 14 or accessed via a data network.

In some embodiments, the database of verification patterns and the specific and associated identification data, if available, may be stored in an external or remote apparatus.

In some embodiments, the apparatus 10 upon execution of instructions will transmit the captured target image via a telecommunication network to the external or remote apparatus for processing.

In some embodiments, a restoration process may be performed before comparison of similarity or difference between a captured pattern and a reference or verification pattern takes place. In such embodiments, stored image restoration instructions executable by the processor may be activated for execution when needed.

Figure 13A:
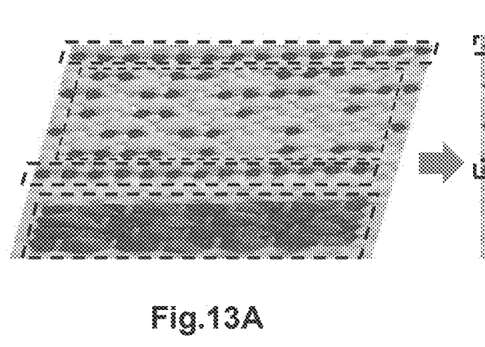
FIGS. 13A and 13B show example distorted and restored authentication patterns.
Figure 13B:
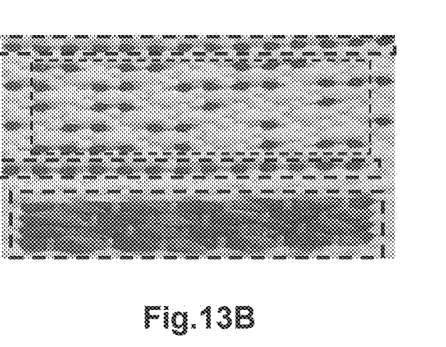

Referring to FIG. 13A, an image of a distorted woven article is shown. After an image of the distorted woven article has been captured, the processor will seek the alignment device on the captured image and examine for integrity of the alignment device. If the alignment device is determined as distorted by the processor, a restoration process will be performed and the restoration will be performed according to the degree of distortion as reflected by the captured alignment device and the restored target image is shown in FIG. 13B.

Figure 14A:
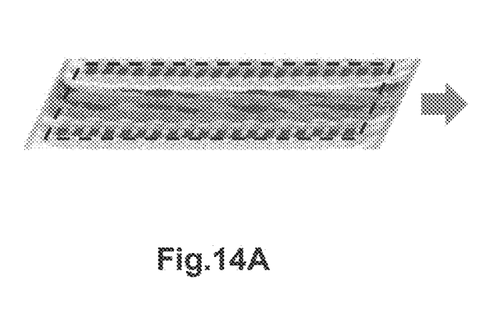
FIGS. 14A and 14B show example distorted and restored authentication patterns.
Figure 14B:
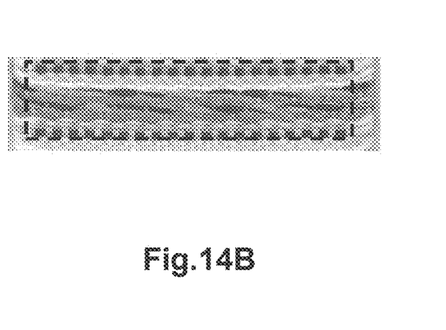

Another distorted image of woven article is shown in FIG. 14A and the restored image is shown in FIG. 14B.

While various examples have been described herein, it should be appreciated that the examples are to assist understanding and not intended to limit or restrict scope of disclosure.

The invention claimed is:

1. A woven authentication device comprising a woven authentication pattern, wherein the woven authentication pattern comprises a plurality of pattern forming woven elements each defining at least one pattern defining element or a plurality of pattern defining elements, and each pattern forming woven element is formed by a plurality of threads having contrasting optical or visual properties in twisted mutual engagement, wherein said pattern defining element has a spiralling outline or boundary and adjacent or abutting pattern defining elements of a pattern forming woven element are visually or optically distinguishable, further comprising
an identification pattern which contains identification data, wherein the identification data are human readable or are process-able by a processor-based or computer-based device to retrieve a reference pattern or patterns for verifying authenticity with respect to the authentication pattern;
wherein the identification data is formed by a plurality of woven identification elements and area density of the woven identification elements is substantially lower than area density of the pattern forming woven elements; the identification data contains information on location of a pattern storage device from which the reference pattern or patterns for verifying authenticity is retrievable; or the authentication pattern and the identification pattern are woven as an integral and flexible woven piece.

2. The authentication device according to claim 1, wherein the woven authentication pattern occupies an area which is smaller than area occupied by the identification pattern.

3. A woven authentication device comprising a woven authentication pattern and a woven identification pattern,
wherein the woven authentication pattern comprises a plurality of threads of contrasting optical or visual properties in twisted mutual engagement and forming a row of pattern forming woven elements or a plurality of rows of pattern forming woven elements, wherein adjacent pattern forming woven elements on a row are separated by a woven partitioning element;
wherein the pattern forming woven element comprises a plurality of pattern defining elements, the pattern defining element having a spiraling or helical boundary, and wherein the pattern defining elements are in twisted mutual engagement and having contrasting optical or visual properties, and
wherein the woven identification pattern contains an identification data which is formed by a plurality of woven identification elements, and wherein the identification data contains information on location of a pattern storage device from which a reference pattern or patterns for verifying authenticity of the woven authentication pattern is retrievable.

4. The woven authentication device of claim 3, wherein the pattern defining element of a pattern forming woven element is either in abutment with one adjacent pattern defining element or two adjacent pattern defining elements; wherein the pattern defining element has an internal abutment boundary and the internal abutment boundary of a pattern defining element which is in abutment with two adjacent pattern defining elements comprises a pair of spaced apart internal abutment boundary outlines, wherein the spaced apart internal abutment boundary outlines of the pattern defining element are parallel or substantially parallel.

5. The woven authentication device of claim 4, wherein each spaced apart internal abutment boundary outline spirals or runs in a helical manner.

6. The woven authentication device of claim 3, wherein the row of pattern forming woven elements has a non-uniform density of pattern defining elements per unit length.

7. The woven authentication device of claim 3, wherein each pattern forming woven element is digitally coded and woven according to a data coding scheme.

8. The authentication device according to claim 3, wherein the woven authentication pattern is formed into a plurality of adjacent or abutting rows of pattern forming woven elements and a plurality of adjacent or abutting columns of pattern forming woven elements; and at least some of the pattern forming woven elements comprise a plurality of spiralling or helical pattern defining elements, said spiralling or helical pattern defining elements being in twisted mutual engagement and having contrasting colours.

9. The authentication device according to claim 3, wherein the woven authentication pattern comprises a plurality of N pattern forming woven elements, and the N pattern forming woven elements contain M pattern defining elements, both M and N are integers and M≥N; and wherein adjacent or abutting pattern defining elements of a pattern forming woven element are visually differentiable or distinguishable from each other and wherein M is equal to or larger than 3N.

10. The authentication device according to claim 3, wherein at least one or all of the plurality of threads has a denier value of 100 or below.

11. The authentication device according to claim 3, wherein the authentication device comprises an alignment device, the alignment device comprising alignment elements which are distributed around, adjacent or abutting the woven authentication pattern.

12. The authentication device according to claim 3, wherein the identification data are process-able by a processor-based or computer-based device to retrieve a reference pattern or patterns for verifying authenticity with respect to the authentication pattern; and an alignment device is disposed proximal to the woven authentication pattern or the identification pattern.

13. A woven authentication device comprising a woven authentication pattern, wherein the woven authentication pattern comprises a string which is formed by twisted mutual engagement of a plurality of threads, and the threads have contrasting optical or visual properties,
wherein the string extends along a longitudinal direction, has a transversal extent and is partitioned into a plurality of length portions to define a corresponding plurality of pattern forming woven elements, the plurality of pattern forming woven elements being distributed in series or consecutively to form a row of pattern forming woven elements;
wherein each pattern forming woven element has a transversal extent and comprises one pattern defining element or a plurality of pattern defining elements; and wherein each one of the pattern defining elements has an external boundary, and the external boundary comprises two spaced apart external boundary outlines which cooperate to define the transversal extent of the pattern forming woven elements and the transversal extent of the string; and wherein the woven authentication pattern comprises a plurality of N pattern forming woven elements, and the N pattern forming woven elements contain M pattern defining elements, both M and N are integers and M≥N; and wherein adjacent or abutting pattern defining elements of a pattern forming woven element are visually differentiable or distinguishable from each other, and wherein M is equal to or larger than 2N.

14. The woven authentication device according to claim 13, wherein adjacent pattern forming woven elements on a row are separated by a woven partitioning element, and wherein the string is a weft element and the woven partitioning element is a warp element extending in a transverse direction to the longitudinal direction, or wherein the string is a warp element and the woven partitioning element is a weft element extending in a transverse direction to the longitudinal direction.

\* \* \* \* \*